United States Patent [19]

Kondo

[11] Patent Number: 5,556,717
[45] Date of Patent: Sep. 17, 1996

[54] COATING-TYPE MAGNETIC RECORDING MEDIUM COMPRISING AN ASCORBIC ESTER COMPOUND IN OR ON A MAGNETIC RECORDING LAYER

[75] Inventor: Hirofumi Kondo, Miyagi, Japan

[73] Assignee: Sony Corporation, Tokyo, Japan

[21] Appl. No.: 326,959

[22] Filed: Oct. 21, 1994

[30] Foreign Application Priority Data

Oct. 27, 1993 [JP] Japan .................................. 5-269286

[51] Int. Cl.$^6$ ................................ G11B 5/66; G11B 5/70
[52] U.S. Cl. ................................ 428/694 B; 428/694 BP; 428/900
[58] Field of Search ................ 428/694 BP, 694 B, 428/694 BC, 69 BU, 694 BP

[56] References Cited

U.S. PATENT DOCUMENTS 5,104,751  4/1992  Ohya et al. .............................. 428/695

FOREIGN PATENT DOCUMENTS

585102B2  4/1989  Australia .
2048659A  2/1990  Japan .
2117890A  5/1990  Japan .

*Primary Examiner*—Paul Thibodeau
*Assistant Examiner*—Michael LaVilla
*Attorney, Agent, or Firm*—Hill, Steadman & Simpson

[57] ABSTRACT

A magnetic recording medium comprises a non-magnetic support and a magnetic layer formed on the support wherein an ascorbic ester compound is incorporated in or formed on the magnetic layer. The medium has good durability under different and severe use conditions.

3 Claims, No Drawings

COATING-TYPE MAGNETIC RECORDING MEDIUM COMPRISING AN ASCORBIC ESTER COMPOUND IN OR ON A MAGNETIC RECORDING LAYER

BACKGROUND OF THE INVENTION

This invention relates to magnetic recording mediums such as magnetic tapes, magnetic disks and the like and more particularly, to coating-type magnetic recording mediums which comprise ascorbic esters in or on a magnetic layer.

With so-called coating-type magnetic recording mediums which meet a recent demand for high recording density, a magnetic paint comprising very fine magnetic particles and a resin binder is applied onto a non-magnetic support to provide a magnetic layer thereon. In order to reduce a spacing loss, the magnetic layer has very good smoothness on the surface thereof.

This eventually leads to a great substantial contact area relative to sliding members, resulting in a great coefficient of friction. This will, in turn, cause a magnetic head portion to become high in temperature and thus, oxidation is more liable to occur, with the attendant problem that a substantial spacing loss results, with a lowering of output.

This usually results from a "brown stain phenomenon" wherein the head portion undergoes discoloration. The reason why such a brown stain takes place has never been discussed in detail yet, and it is considered that the stain is one caused by oxidation of the head or by deposition of an oxidized binder of a magnetic tape.

More particularly, it has been simulated that under high-speed sliding conditions with magnetic heads, a temperature at the friction point between the head and the medium reaches several hundred degrees centigrade or over. It is considered that at such high temperatures, the binder is oxidized or a material for the head may be oxidized, thereby bringing about an increase in leveling down quantity and eventual clogging of the head.

In the field of magnetic recording mediums, the durability degrades owing to the shortage in capability of additives used, particularly, lubricants. In other words, these additives cannot suppress the brown stain phenomenon based on the discoloration of a head portion. Thus, practical performances including an increase of a level-down quantity and a head-clogging defect are not satisfactory.

SUMMARY OF THE INVENTION

It is accordingly an object of the invention to provide a coating-type magnetic recording medium which ensures good wear resistance and good durability of both a magnetic head and the medium, so that a level-down quantity is reduced or the head is prevented from clogging over a long time.

It is another object of the invention to provide a coating-type magnetic recording medium which comprises an ascorbic ester additive in or on a magnetic layer whereby good lubricity of the medium is ensured under any use conditions over a long time and thus, the medium has good durability.

The above objects can be achieved, according to the invention, by a coating-type magnetic recording medium which comprises a non-magnetic support and a magnetic layer formed on the support wherein an ascorbic ester is contained in the magnetic layer or is formed on the magnetic layer as a top coating after dissolution in an organic solvent.

More particularly, the magnetic recording medium of the invention comprises a non-magnetic support and a magnetic layer containing a magnetic powder therein and formed on the non-magnetic support wherein an ascorbic ester compound of ascorbic acid and at least one carboxylic acid and having the following general formula

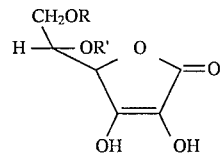

wherein R and R' independently represent a carboxylic acid residue i.e., an acyl group, or hydrogen, is contained in the magnetic layer or formed on the magnetic layer as a top coating.

DETAILED DESCRIPTION OF THE INVENTION

The ascorbic acid esters used in the present invention are first described.

The acid esters of the formula defined above can be readily prepared, for example, according to the D. Swern et al's method (Oil & Soap, p. 224 (1943)). It is important that the hydroxyl groups bonded to the double bond should not be esterified but the other hydroxyl groups have to be esterified as defined. This is because the hydroxyl groups joined to the double bond have the reducing action to prevent oxidation during the course of sliding with a head and to prevent leveling down and head clogging.

According to the preparation method, ascorbic acid and an intended carboxylic acid are added to 95% concentrated sulfuric acid and are allowed to stand over 16 hours, followed by extraction with diethyl ether. Thereafter, the solution was washed to neutrality. After evaporation of the solution, the resultant residue is recrystallized from a mixed solution of diethyl ether and hexane to obtain a pure product. It will be noted that the preparation is not limited to one which has been set out hereinabove.

The alkyl moiety in the carboxylic acid used is not critical with respect to the carbon atoms and it is preferred that the alkyl group of a carboxylic acid has not larger than 14 carbon atoms when the carboxylic acid is linear. This is because when the alkyl group has 15 or higher carbon atoms, the melting point becomes so high that the resultant acid ester is apt to form white powder when incorporated in or coated on the magnetic layer.

Since the carboxylic acid has a relatively smaller number of carbon atoms, the melting point is lower, thus the acid being unlikely to separate out when contained in the magnetic layer. To this end, the melting point should preferably be not higher than 110° C. It will be noted that ascorbic acid has a melting point of 192° C. In practice, the separation of the acid is liable to cause drop-out and head clogging.

The acid may have a branched hydrocarbon chain or may contain a double bond, by which the melting point becomes lower. Moreover, the carboxylic acid may contain an aromatic ring in the molecular chain provided that the melting point does not become undesirably high.

The magnetic recording medium of the invention should have such an ascorbic ester in or on the magnetic layer.

The magnetic recording medium of the invention includes a so-called coating-type magnetic recording medium wherein a magnetic paint is applied onto the surface of a non-magnetic support and dried to form a magnetic layer on the support. The non-magnetic support, magnetic powders and resin binders may be ones which are ordinarily employed in known coating-type magnetic recording mediums without limitation. The ascorbic ester may be applied to the magnetic layer by incorporation therein or as a top coating.

For instance, the non-magnetic support may be made of polymer resins such as polyesters, polyolefins, cellulose or derivatives thereof, vinyl resins, polyimides, polycarbonates and the like, metals such as aluminum alloys, titanium alloys and the like, ceramics such as aluminum glasses, glasses and the like. The support is not critical with respect to its shape and may take any forms such as tapes, sheets, drums and the like.

The magnetic powder may be ferromagnetic metal particles made, for example, of metals such as Fe, Co, Ni and the like and oxides thereof, and alloys containing these metals and oxides.

The resin binders include, for example, polymers of vinyl chloride, vinyl acetate, vinyl alcohol, vinylidene chloride, acrylic esters, methacrylic esters, styrene, butadiene, acrylonitrile and the like, copolymers of those monomers mentioned above, polyurethane resins, polyester resins, epoxy resins and the like. In order to improve the dispersability of a magnetic powder, these binders may be introduced with a sulfonic group, a carboxyl group, a phosphoric group or the like.

For the application of ascorbic ester compounds to such a coating-type magnetic recording medium, a method of incorporating the ester compound in the magnetic layer may be used. Where the ascorbic ester is internally added to or incorporated in the magnetic layer, the amount ranges from 0.2 to 20 parts by weight per 100 parts by weight of the resin binder. Alternatively, there may be used a method wherein an ascorbic ester compound is dissolved in organic solvents and the resultant solution is top-coated onto a magnetic layer. The concentration is not critical and is preferably in the range of from 0.1 to 10 wt %. If the concentration is too high, sticking is liable to occur. A smaller concentration results in a poorer effect.

The ascorbic ester compound serves to lessen the brown stain of a magnetic head and to reduce head clogging, with the durability of a magnetic medium being improved. The improved durability is scarcely impeded under severe conditions such as low temperature conditions. Accordingly, the magnetic recording medium having an ascorbic ester compound therein is improved in runnability, resulting in improvements not only in durability, but also in magnetic characteristics and surface properties owing to its good disperability.

The present invention is more particularly described by way of examples, which should not be construed as limiting the invention thereto.

Five ascorbic esters shown in Table 1 were prepared by the procedure set out hereinbefore. The melting points of the esters are also shown in Table 1. These esters were applied to coating-type magnetic recording mediums as shown in Examples described hereinafter.

TABLE 1

|  | Compound 1 | Prepared Ester 1 | Prepared Ester 2 | Prepared Ester 3 | Prepared Ester 4 |
| --- | --- | --- | --- | --- | --- |
| Compound | ascorbic acid | stearyl ester | myristyl ester | lauryl ester | octanoyl ester |
| Melting point (° C.) | 192 | 117 | 108 | 105 | 91 |

EXAMPLE 1

| Magnetic metal powder | 100 parts by weight |
| --- | --- |
| Vinyl chloride-vinyl acetate copolymer | 10.5 parts by weight |
| Polyurethane resin | 10.5 parts by weight |
| Myristic acid | 2 parts by weight |
| Carbon (antistatic agent) | 5 parts by weight |
| Methyl ethyl ketone | 150 parts by weight |
| Toluene | 150 parts by weight |
| Cyclohexanone | 100 parts by weight |

1.5 parts by weight of Prepared Ester 1 in Table 1 was added a composition of the above formulation and mixed for 24 hours by means of a ball mill, followed by passage through a filter, further addition of 4 parts by weight of a curing agent and agitation for 30 minutes. The resultant magnetic paint was applied onto a 12 μm thick polyethylene terephthalate base in a dry thickness of 2 μm and subjected to orientation in a magnetic field, dried and reeled up. The resultant sheet was calendered and cut into ½ inch wide sample tapes.

EXAMPLES 2 to 4

The general procedure of Example 1 was repeated except that prepared esters Nos. 2 to 4 were added in place of prepared ester No. 1, thereby obtaining sample tapes.

EXAMPLE 5

The general procedure of Example 1 was repeated except that a perfluoropolyether (Fomblin-Z-DOL) having a hydroxyl group at ends thereof was added in place of myristic acid in the same amount as in Example 1, thereby obtaining a sample tape.

EXAMPLE 6

The general procedure of Example 1 was repeated except that an oleic ester of a perfluoropolyether (Fomblin-Z-DOL) having a hydroxyl group at ends thereof was added in place of myristic acid in the same amount as in Example 1, thereby obtaining a sample tape.

EXAMPLE 7

The general procedure of Example 1 was repeated except that a trilaurylamine salt of a perfluoropolyether (Fomblin-Z-DIAC) having a carboxyl group at ends thereof was added in place of myristic acid in the same amount as in Example 1, thereby obtaining a sample tape.

Comparative Example 1

The general procedure of Example 1 was repeated except that compound No. 1 was added in place of prepared ester No. 1 in the same amount as in Example 1, thereby obtaining a sample tape.

Comparative Example 2

The general procedure of Example 1 was repeated without use of any additive in place of prepared ester 1, thereby obtaining a sample tape.

The thus obtained sample tapes were each subjected to a quantity of level-down and a degree of head clogging at an initial stage and after 100 traveling cycles under conditions of a temperature of 25° C. and a relative humidity of 60% prior to and after aging. The brown stain was also observed.

The aging was carried out under conditions of a temperature of 40° C. and a relative humidity of 80% for 3 days.

The results are shown in Tables 2 and 3.

TABLE 2

|  | Prior to Aging Level-down | | | After Aging Level-down | | |
|---|---|---|---|---|---|---|
|  | Initial | After 100 Cycles | Head Clogging | Initial | After 100 Cycles | Head Clogging |
| Example 1 | −1.6 | −1.8 | good | −2.3 | −2.1 | good |
| Example 2 | −2.3 | −1.9 | good | −2.2 | −2.0 | good |
| Example 3 | −1.8 | −1.7 | good | −1.9 | −2.1 | good |
| Example 4 | −1.8 | −2.0 | good | −1.9 | −2.1 | good |
| Example 5 | −2.0 | −2.1 | good | −2.2 | −2.3 | good |
| Example 6 | −1.5 | −1.7 | good | −1.8 | −1.9 | good |
| Example 7 | −1.4 | −1.6 | good | −1.7 | −1.9 | good |
| Comp. Ex. 1 | −1.9 | −1.8 | good | −2.2 | −2.2 | good |
| Comp. Ex. 2 | −2.8 | −3.2 | fair | −3.5 | −3.5 | poor |

TABLE 3

|  | Prior to Aging | | After Aging | |
|---|---|---|---|---|
|  | White Powder | Brown Stain | White Powder | Brown Stain |
| Example 1 | good | good | poor | good |
| Example 2 | good | good | good | good |
| Example 3 | good | good | good | good |
| Example 4 | good | good | good | good |
| Example 5 | good | good | good | good |
| Example 6 | good | good | good | good |
| Example 7 | good | good | good | good |
| Comp. Ex. 1 | fair | good | poor | good |
| Comp. Ex. 2 | good | poor | good | poor |

As will be apparent from the results of Tables 2 and 3, the use of ascorbic esters compounds as an additive is effective in improving the durability with a reduced degree of level-down and is more unlikely to degrade through aging. In addition, very good results are obtained with respect to the head clogging.

Although similar results are obtained using the stearyl ester of ascorbic acid, the tape using this ester is more liable to separate the white powder out.

Ascorbic acid is effective in suppressing the head clogging and the brown stain but it has a higher melting point and may separate out white powder prior to aging. This will undesirably result in drop-out defect.

Thus, the magnetic recording medium of the invention has ascorbic ester compounds therein or thereon and exhibit good lubricity under any use conditions over a long time. Thus, the medium of the invention is excellent in durability.

What is claimed is:

1. A magnetic recording medium comprising:
   a non-magnetic support having a surface; and
   a magnetic coating layer disposed on said surface, said magnetic coating layer consisting essentially of:
   a magnetic metal powder;
   a resin binder; and
   an ester of ascorbic acid and at least one carboxylic acid, said carboxylic acid having not greater than 14 carbon atoms, said ester having the formula:

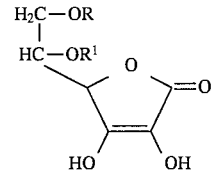

wherein R and R' independently represent hydrogen or an acyl group residue of said carboxylic acid, at least one of R and R' being an acyl group residue of said carboxylic acid.

2. A magnetic recording medium according to claim 1, wherein said ester has a melting point not higher than 110° C.

3. A magnetic recording medium according to claim 1, wherein said ester is present in an amount of 0.2 to 20 parts by weight per 100 parts by weight of said resin binder.

* * * * *